J. V. EVES.
MACHINE FOR HACKLING AND SPREADING FLAX AND OTHER LONG STAPLED FIBERS.
APPLICATION FILED SEPT. 17, 1909.

1,102,895.

Patented July 7, 1914.
7 SHEETS—SHEET 1.

WITNESSES.

INVENTOR.
Joshua V. Eves

J. V. EVES.
MACHINE FOR HACKLING AND SPREADING FLAX AND OTHER LONG STAPLED FIBERS.
APPLICATION FILED SEPT. 17, 1909.

1,102,895.

Patented July 7, 1914.
7 SHEETS—SHEET 3.

WITNESSES.

INVENTOR
Joshua V. Eves
By James L. Norris
Atty

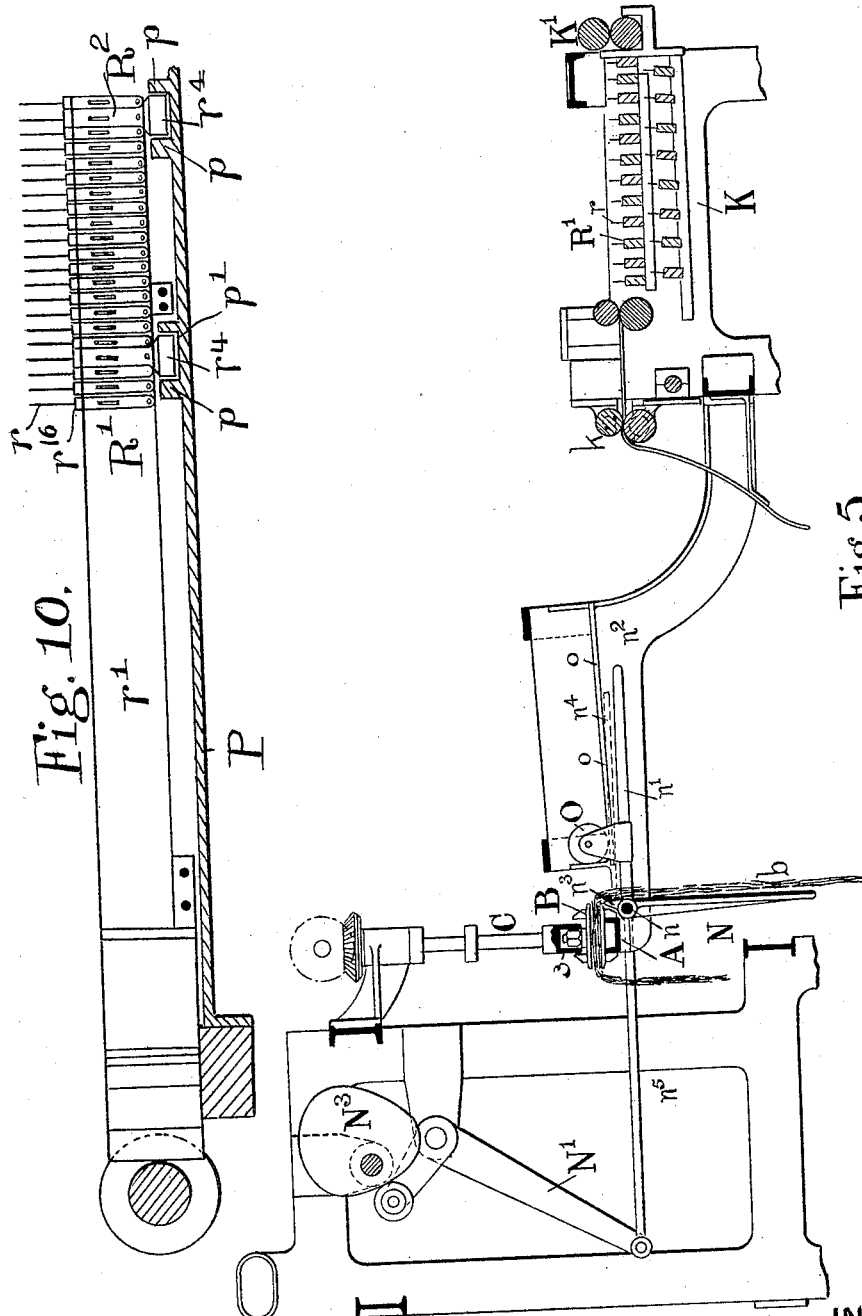

J. V. EVES.
MACHINE FOR HACKLING AND SPREADING FLAX AND OTHER LONG STAPLED FIBERS.
APPLICATION FILED SEPT. 17, 1909.
1,102,895.
Patented July 7, 1914.
7 SHEETS—SHEET 5.
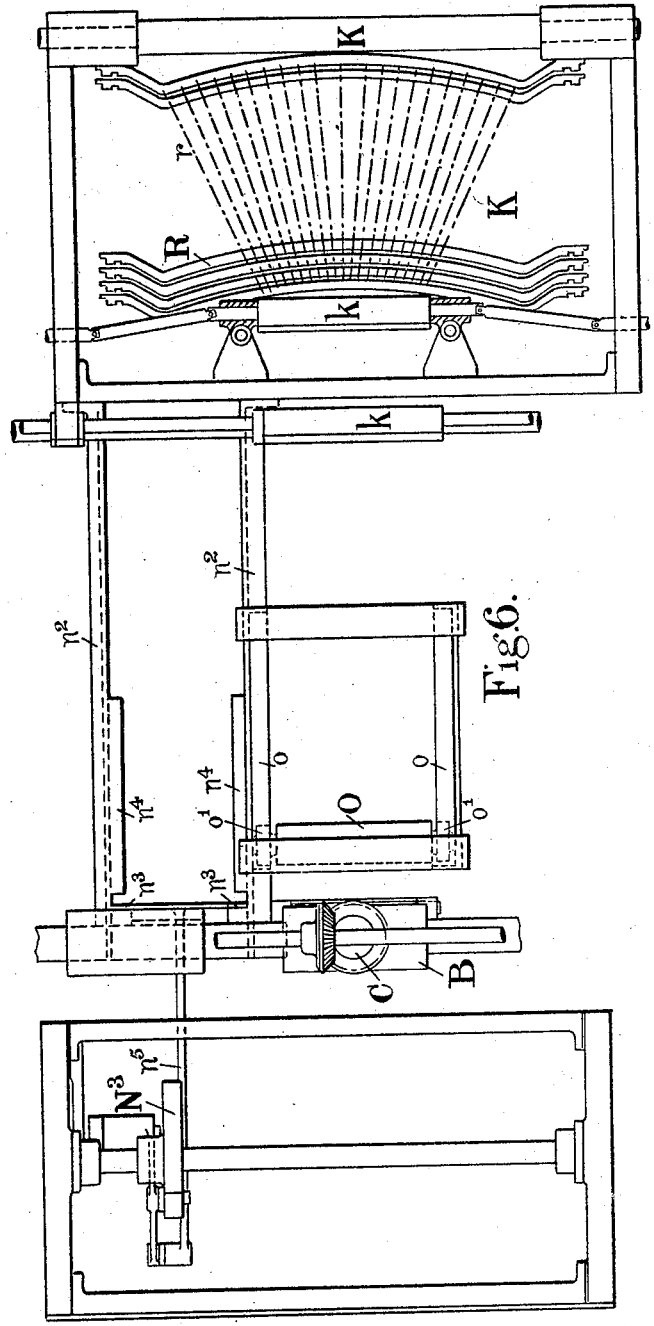
WITNESSES.
INVENTOR.
Joshua V. Eves
By
James L. Norris
Atty

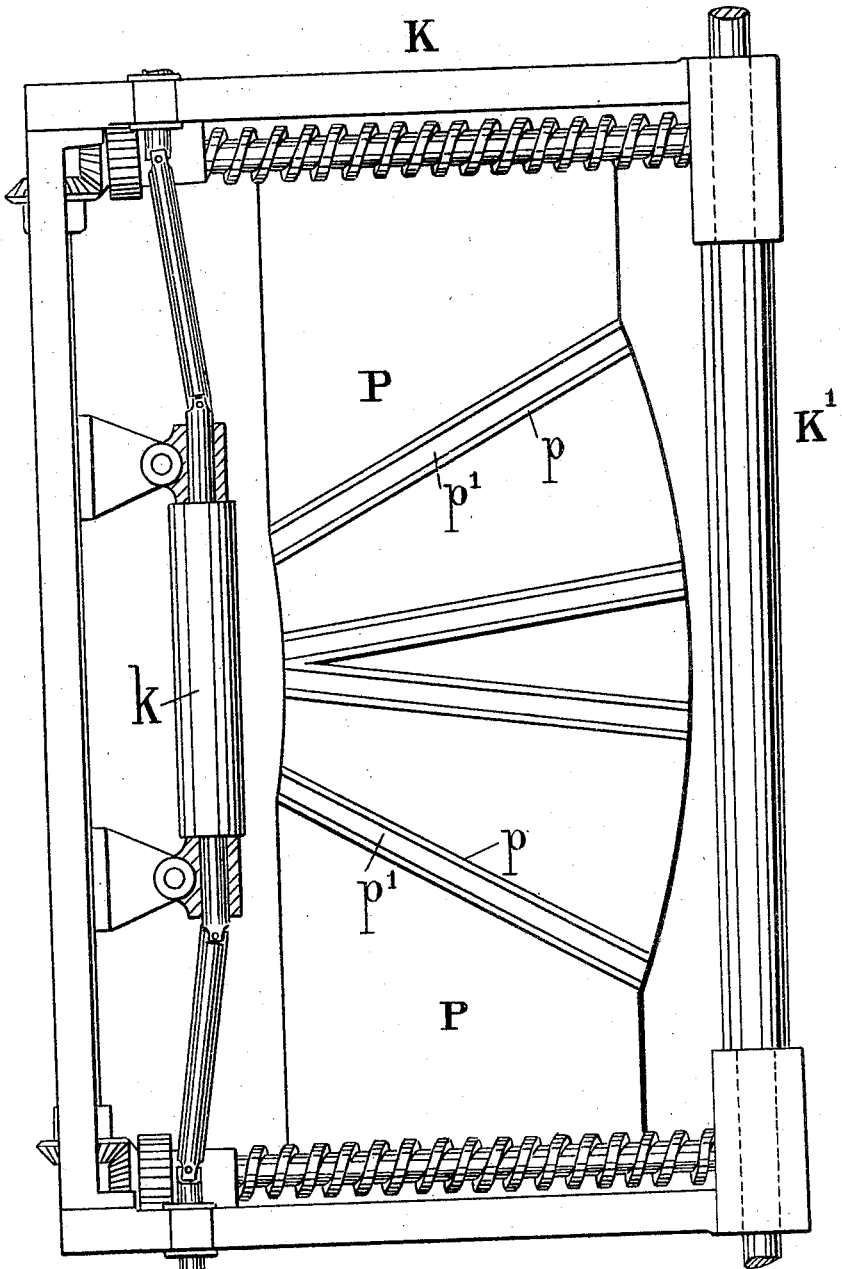

J. V. EVES.
MACHINE FOR HACKLING AND SPREADING FLAX AND OTHER LONG STAPLED FIBERS.
APPLICATION FILED SEPT. 17, 1909.
1,102,895.
Patented July 7, 1914.
7 SHEETS—SHEET 7.
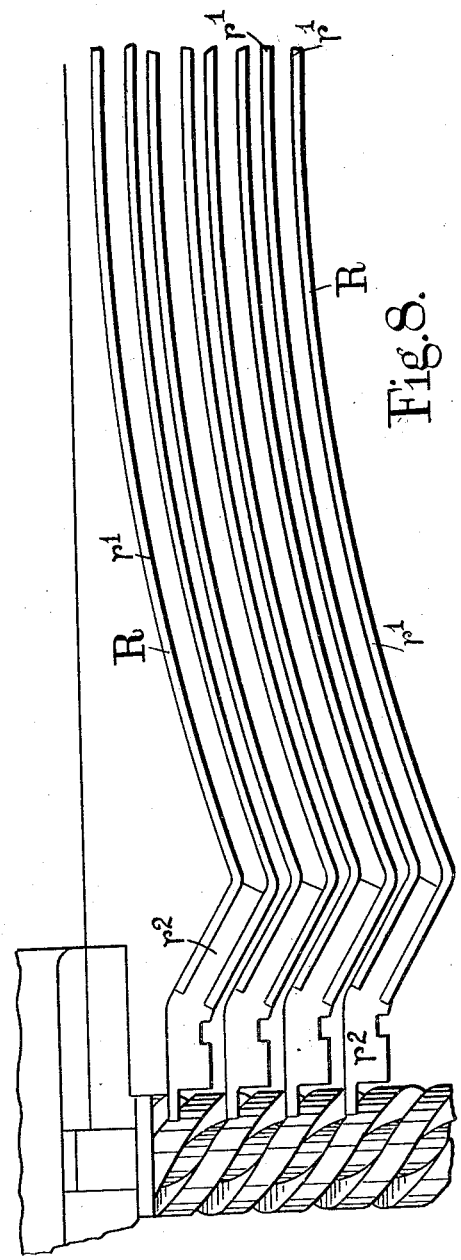
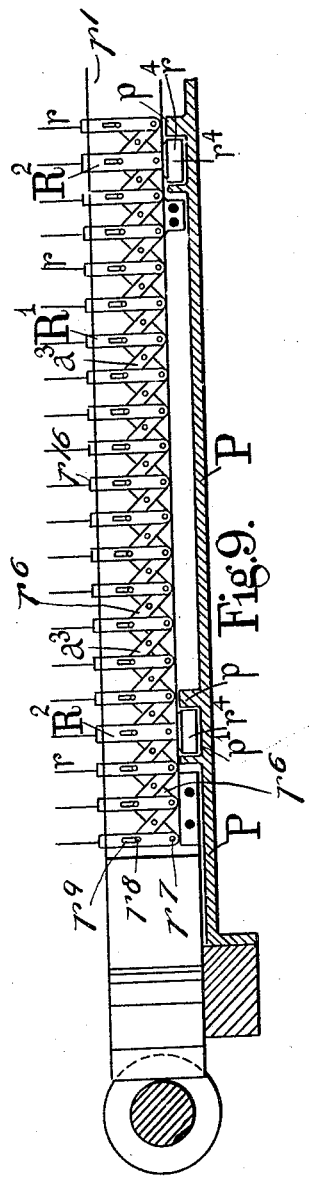

UNITED STATES PATENT OFFICE.

JOSHUA VALENTINE EVES, OF BELFAST, IRELAND.

MACHINE FOR HACKLING AND SPREADING FLAX AND OTHER LONG-STAPLED FIBERS.

1,102,895.

Specification of Letters Patent.

Patented July 7, 1914.

Application filed September 17, 1909. Serial No. 518,273.

*To all whom it may concern:*

Be it known that I, JOSHUA VALENTINE EVES, a British subject, residing at Belfast, county Antrim, Ireland, have invented certain new and useful Improvements in Machinery for Hackling and Spreading Flax and other Long-Stapled Fibers, of which the following is a specification.

This invention relates to apparatus for automatically removing the "stricks" or pieces of hackled flax from which are known as automatic hackling machines (such as described in the specification of Eves's United States Patent 662117 of 1900 or Reade Crawford and McKibbin's United States Patent 775352 of 1904 or other similar machines) and feeding them to the ordinary spreading machines by which the fibers are first drawn out into the form of slivers or narrow bands.

Hitherto it has been customary to remove the stricks or pieces of flax by hand from the hackling machine holders and pile them in bunches or "tipples" and subsequently to lay each piece by hand upon the traveling apron of the spreading machine.

The invention consists essentially of apparatus by which the flax is removed or lifted from the holder in which it has been hackled and deposited on a traveling apron or table or fed between rollers and also in apparatus by which the pieces or stricks of flax are divided or spread out laterally in a considerably thinner sheet for the proper working or drawing thereof in the spreading machine.

The invention will be fully described with reference to the accompanying drawings forming part of the specification.

Figure 1:
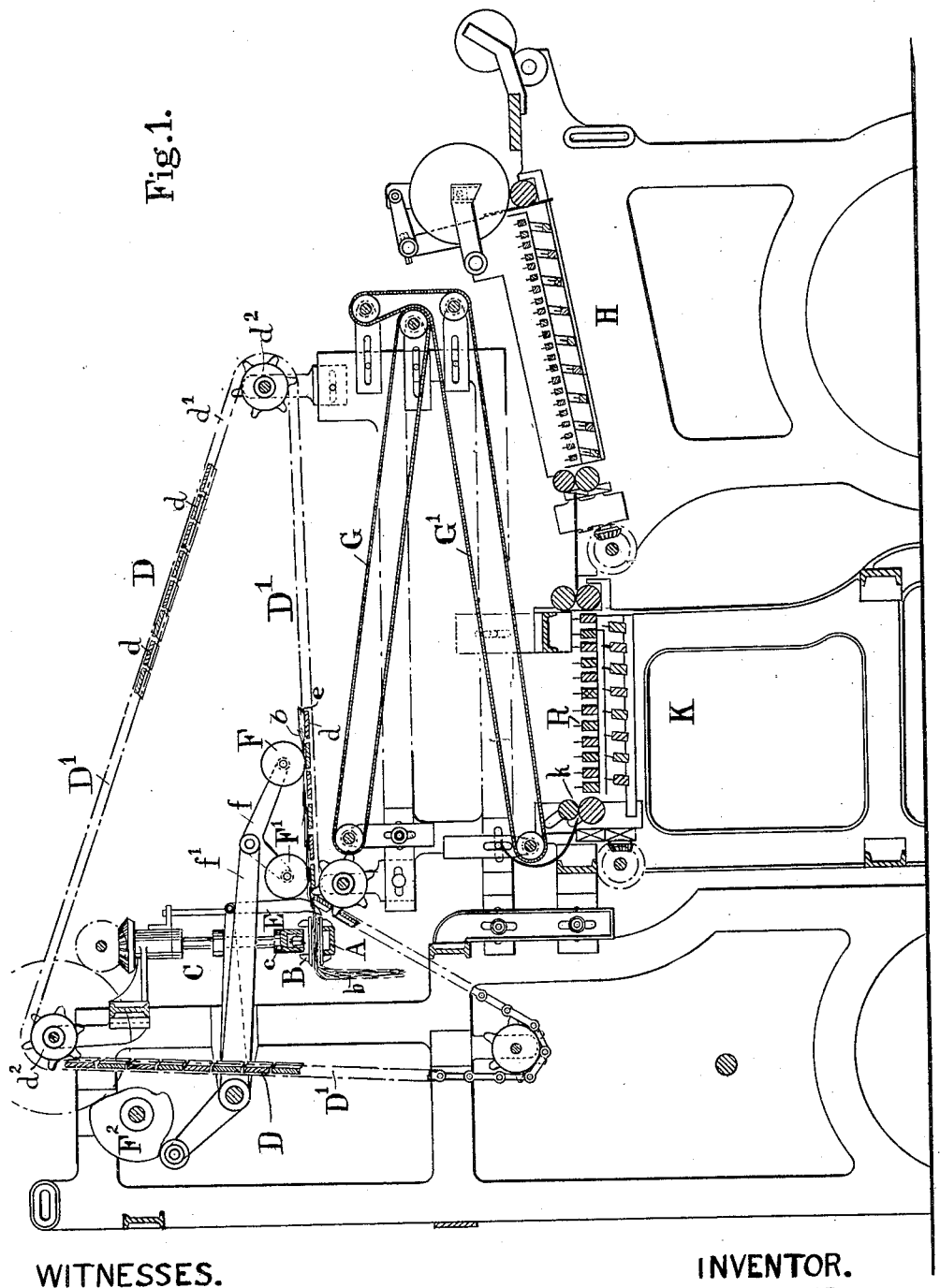
Figure 2:
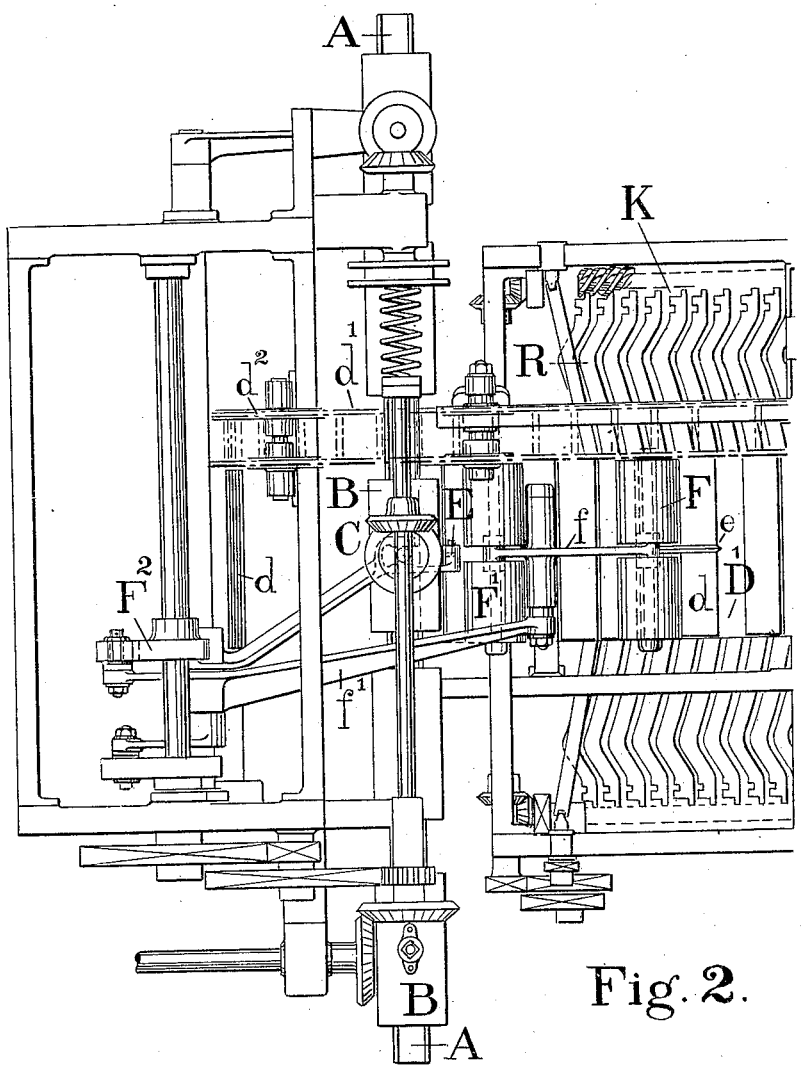
Figure 3:
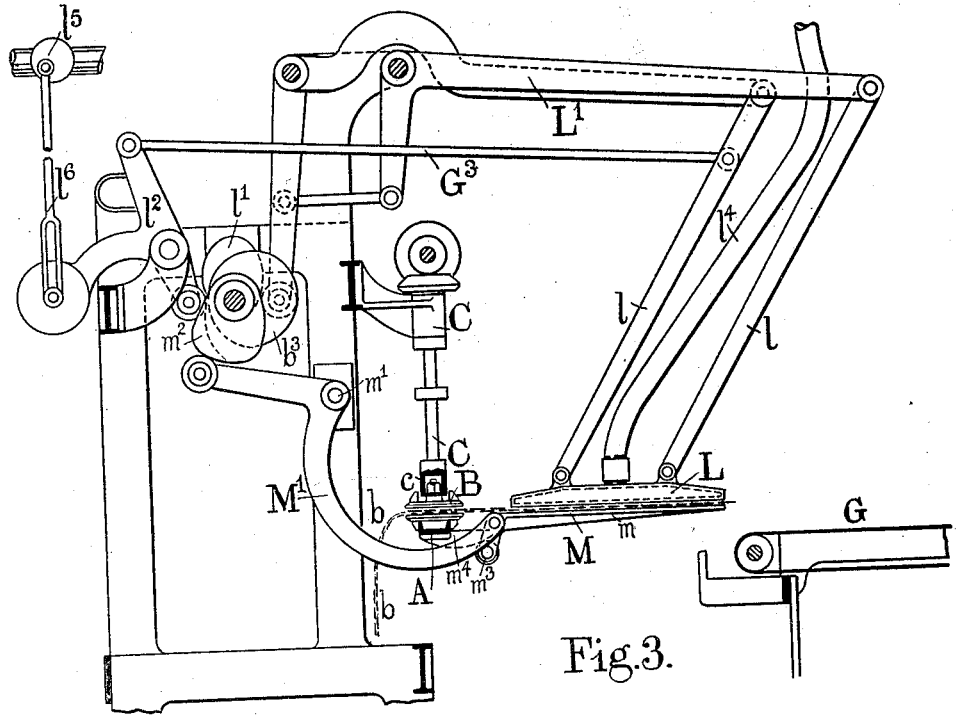
Figure 4:
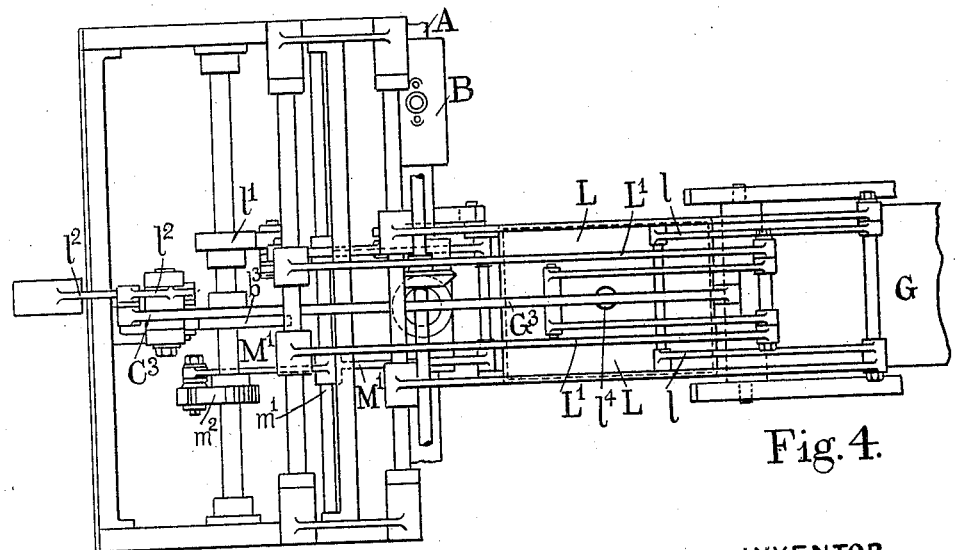

Figure 1 is a longitudinal vertical section of the filling end of an automatic hackling machine with the automatic removing and laying apparatus applied thereto and connected with the spreading machine. Fig. 2 is a fragmental plan view of same. Fig. 3 is a fragmental side elevation of the filling end of an automatic hackling machine with pneumatic or suction removing apparatus applied thereto. Fig. 4 is a plan view of the apparatus shown in Fig. 3. Fig. 5 is an elevation of a modification of the automatic hackling machine, with the automatic removing and laying apparatus applied thereto similar to Fig. 1. Fig. 6 is a plan view of Fig. 5. Fig. 7 is a plan view of the gill frame showing the faller slides. Fig. 8 is an enlarged plan view of the fallers. Fig. 9 is a side elevation of one form of faller blocks mounted on "lazy-tongs" the latter being shown expanded. Fig. 10 is a side elevation of the "lazy-tongs" closed.

The automatic hackling machine is constructed in any ordinary way with a cross channel A to receive the screwed holders B as they emerge from the machine, and mechanism C for unscrewing the holders and relieving the pressure on the flax $b$. In front of the channel A I place mechanism by which the free end of the piece or strick of flax $b$ is engaged and the piece is automatically drawn out of the holder B and spread out and delivered to the succeeding mechanism.

In the form shown in Figs. 1 and 2 in front of the channel A and holders B a traveling table D is mounted to draw the flax $b$ out of the holders B. The table is constructed of two or more sections or lengths D with open spaces D' between them, each section being formed of transverse bars $d$ carried by endless chains $d'$ which pass over chain pulleys $d^2$. The movement of the traveling table is so timed that one section of it comes into position and lifts the end of flax $b$ depending from the holder B at the time the pressure is relieved therefrom by the unscrewing of the bolt by the unscrewing mechanism C or at some other suitable time, and then carries the flax forward. A suitably shaped dividing knife or blade E is placed in front of the holder B to divide the flax $b$ contained in the holder into two separate pieces as it is drawn therefrom by the table. The knife or blade E is attached by a bracket to the unscrewing mechanism C and descends with the box key $c$ as the latter is brought down over the nut of the holder B. In addition to the knife E for dividing the pieces of flax $b$ inverted V pieces $e$ may be affixed to the transverse bars $d$ of the table sections to assist in separating and keeping separate the two pieces of flax on the table. Above the table D a pair of rollers F F' carried by a bracket are mounted so as to rest on the table D of their own weight (or assisted by a spring) and be raised therefrom when required. The rollers are supported by arms or levers $f$ $f'$ and are raised and lowered as required by a cam $F^2$, being so timed as to be lowered to rest upon the flax $b$ on the table D simultaneously with the unscrewing of the nut of the holder B. The flax $b$ is gripped between the rollers F F' and the table D and as the latter moves forward the piece of flax $b$ is withdrawn from the holder B and carried forward by the table D. Below the traveling table D is placed a traveling apron G of woven material (or other suitable material) the apron being of suitable width to receive the divided pieces of flax from the table D and moving at a slower speed than said table. When the strick or piece of flax is drawn completely out of the holder B the rear end of the table D is under the front roller F and the end of the flax $b$ hangs over the table and rests upon the traveling apron G. As the rear end of the table D passes from under the roller F the latter is allowed by the shape of the cam $F^2$ to drop and rest upon the apron G and the flax $b$ is gripped between the roller F and the slowly moving apron G. The table D moves forward from under the flax which is deposited on the apron G. This operation is continually repeated, each of the tables D taking the flax $b$ from the holder B and laying it on the apron G at regular intervals, thus forming a continuous sheet or sliver of flax on the traveling apron G. The piece of flax $b$ may be delivered by the apron G direct to the spreading machine H, or to any other machine, but to economize space I prefer to employ a second traveling apron G' placed below the apron G. In this case the piece of flax is carried around and laid upon the second apron G' from which it is fed between the back rollers $k$ of a gill frame K constructed with expanding fallers (as hereinafter described) for widening and thinning the pieces of flax $b$ before being subjected to a drawing process in the ordinary gill machine or spreading machine H.

In the form shown in Figs. 3 and 4 in front of the channel A and holders B a suction plate or nozzle L is mounted by which the stricks or pieces $b$ of flax are drawn from the holders B and deposited on the traveling apron G. The suction plate L is suspended from levers L' by links $l$ and is raised and lowered as required by the cam $l'$, and the suction plate is moved to and fro by a lever $l^2$ operated by a cam $b^3$ and connected to it by a connecting rod $G^3$. The suction plate L has a perforated face and is connected to an air pump or exhauster (not shown) by an air pipe $l^4$ having a valve $l^5$ the valve $l^5$ being operated at the ends of the stroke of the lever $l^2$ to which it is connected by the rod $l^6$. Below the channel A and holder B a plate M is pivotally suspended on a lever $m$ from a lever M'. The lever M' is pivoted on a fulcrum $m'$ and is rocked by a cam $m^2$. When rocked forward the rear end $m^3$ of the lever $m$ is brought into contact with a fixed cam surface $m^4$ and raised to a horizontal position. As each holder B comes into position and the nut of the holder is slackened by the unscrewing mechanism C, the plate M is raised into horizontal position and with it the ends of the flax $b$ are lifted. The suction plate L is at the same time moved into position to rest upon the flax $b$ on the plate M and by the movement of the valve $l^5$ connection is established with the air pump, causing the flax to adhere to the underside of the suction plate. The suction plate L, with the flax $b$ adhering to it is then moved over the apron G the connection with the air pump cut off by a further movement of the valve $l^5$ and the flax deposited on the apron G of the gill frame K provided with expanding fallers.

In the form shown in Figs. 5 and 6 an arrangement is shown for feeding the stricks or pieces $b$ of flax from the holders B direct to the rollers $k$ of the gill frame K without the intervention of a traveling table or apron. Below the channel A and in front of the holders B a plate N is pivoted similar to the swinging plate M previously described. The plate N is suspended from a rod or spindle $n$ carried in sliding bearings capable of being moved to and fro along a slot $n'$ in the frame $n^2$. At a suitable position on the rod $n$ two projecting lugs $n^3$ are fitted and on the frame $n^2$ two horizontal flanges $n^4$ are formed against which the lugs $n^3$ strike as the rod $n$ is moved forward along the slot thereby causing the rod $n$ to rock, swinging the plate N into horizontal position with the flax $b$ upon it. The plate N in the horizontal position is moved forward by the lever N' and connecting rod $n^5$ until it reaches the rollers $k$ of the spreading machine K. The last portion of forward traverse of the plate N is made at the same surface speed as the rollers $k$ so as to feed the flax in at the correct speed. This is accomplished by the shape of the cam $N^3$. The lugs $n^3$ on the rod $n$ then pass from under the flanges $n^4$ and the plate swings back to the vertical leaving the flax in the nip of the rollers $k$. The lever N' is operated by the cam $N^3$. A roller weight O serves to grip the flax $b$ and draw it forward with the plate N out of the holder B. When the plate N is raised to the horizontal position the flax is held between it and the weight O which is ordinarily supported by rollers $o'$ resting on inclined rails $o$ located above the plate, but is lifted clear of the rails by the plate N so that its whole weight rests on the flax. When the plate N falls at the end of its forward travel the weight O is lowered with the rollers $o'$ upon the inclined rails $o$, down which rails said rollers run, returning the weight to its original position. The gill frame K which receives the stricks or pieces $b$ of flax from the automatic mechanism by which they are removed from the holder B is constructed with expanding fallers R in which the pins $r$ can be moved apart as they move forward from the feed rollers for the purpose of widening and thinning the pieces of flax $b$. The fallers R are constructed of two bars $r'$ (curved or straight) riveted or secured to suitably shaped end pieces $r^2$. In the space between the bars $r'$ a number of faller blocks R' are placed each carrying one pin $r$. The blocks R' are so arranged as to move toward or from each other, carrying with them the pins $r$. This may be effected in any suitable manner, but, preferably, by mounting said blocks upon an expanding "lazy-tongs" $a^3$ one mounted at each joint so that as the members of the "lazy-tongs" are expanded or contracted the faller blocks R' and pins $r$ are moved farther from or closer to each other. The faller blocks and pins are made in two sets or lengths across the frame and at or near either end of each set one of the faller blocks $R^2$ carries a roller $r^4$. The "lazy-tongs" are made up of suitable links $r^6$ jointed at the ends and at the middle in such a way that a pin $r^7$ forming a joint for the ends of two links is directly below or in line with the pin $r^8$ forming a joint for two other links. The faller blocks R', $R^2$ are mounted on the pins $r^7$ and are controlled to always remain in a vertical position by the disposition of the pins $r^8$ in the slots $r^9$. The slots $r^9$ allow said pins $r^8$ to slide up and down as the "lazy-tongs" expand and contract. The faller slides P are fitted with cam plates $p$ extending across the gill frame provided with cam grooves $p'$ in which the rollers $r^4$ travel as the fallers are moved from one end of the frame to the other and expand or contract the "lazy-tongs". The faller is lifted up as is customary by the ordinary mechanism (not shown) in front of the roller $k$ with the faller blocks R' and pins $r$ in the closed position and the rollers $r^4$ enter the cam grooves $p'$ and the pins $r$ pass through the stricks or pieces of flax $b$. (See Fig. 7.) As each faller moves forward the cam paths cause the pins $r$ to widen out. Thus in its passage through the frame K each strick of flax as delivered from the hackling machine holder B is widened out and the distances between the stricks is increased. As the fallers drop at the front of the frame and rise at the back, the runners $r^4$ leave the control of the cam paths $p'$ but are held in their position by the friction of the "lazy-tongs" against the sides of the faller bars $r'$.

In order to regulate the thickness of the sheet of flax delivered to the feed rollers of the spreading machine H it is only necessary to change the relative speeds of the spreading machine and the hackling machine and so alter either the rate of delivery from the hackling machine, or the rate of travel of the moving apron of the spreading machine. This may be done by driving each machine separately and changing the speed of one or both; or by driving the spreading machine from the hackling machine or vice versa, by gearing with which is incorporated a wheel adapted for changing or by other means.

Although the spreading machine has been spoken of as being adjacent to the hackling machine it may if thought preferable, be placed at any other convenient position or in another room, and the moving apron be lengthened accordingly.

What I claim as my invention and desire to protect by Letters Patent is:—

1. The combination with a machine for hackling flax and other long staple fibers provided with vertical, opposed hackling sheets, of the transverse channel, flax holders placed thereon and having separably connected parts, mechanism for separating the parts of said holders, and means for removing the completely hackled flax from the holders after the parts thereof have been separated and delivering it at a distance therefrom, substantially as described.

2. In a machine for hackling flax and other long staple fibers, the combination with the transverse channel, the screw-clamped flax holders, and mechanism for unscrewing the holders, of means for removing the completely hackled flax from said holders and delivering same at a distance therefrom, substantially as described.

3. In a machine for hackling flax and other long staple fibers, the combination with the transverse channel, the screw-clamped flax holders placed thereon, and the mechanism for unscrewing the holders, of mechanism to seize the completely hackled flax, draw it from the holders and deliver it from said holders, substantially as described.

4. In a machine for hackling flax and other long staple fibers, the combination with the transverse channel, the screw-clamped flax holders placed thereon, and the mechanism for unscrewing the holders, of a traveling table made in sectional lengths, gripping devices operating therewith, a cam to control the gripping devices, and means for removing the flax and delivering it elsewhere, substantially as described.

5. In a machine for hackling flax and other long staple fibers, the combination with the transverse channel, the screw-clamped flax holders placed thereon, and the mechanism for unscrewing the holders, of a traveling table constructed in sectional lengths and provided with open spaces between the sections, the gripping rollers, pivoted levers by which the rollers are supported, a cam to control the gripping rollers, and a traveling delivery apron to receive the flax from the table, substantially as described.

6. In a machine for hackling flax and other long staple fibers, the combination with the transverse channel, the screw-clamped flax holders placed thereon, and the mechanism for unscrewing the holders, of a traveling table constructed in sectional lengths and provided with open spaces, a dividing knife attached to the screwing mechanism and placed in front of the holders to divide the flax, and gripping rollers arranged to rest upon the table and draw the flax out of the holders, substantially as described.

7. The combination with a machine for hackling flax or other long staple fibers, and its holders, of a traveling table made in sectional lengths, gripping devices by which the fibers are gripped and drawn from the holders, a cam for contact with said gripping devices for controlling the same, a knife or blade to divide the stricks of flax into separate parts, and an endless delivery apron to receive the pieces of flax, substantially as described.

8. The combination with a machine for hackling flax and other long staple fibers, and its holders, of means for mechanically removing the stricks of flax from the holders, means for transferring the flax to a gill frame, and means for expanding the stricks of flax, substantially as described.

9. In a machine for hackling flax and other long staple fibers, the combination with the transverse channel, the screw-clamped flax holders placed thereon, the mechanism for unscrewing the holders, and the mechanism to seize the stricks of flax and draw them therefrom of expanding fallers to expand the stricks of flax as such are delivered to the gill frame, substantially as described.

10. In a machine for hackling flax and other long staple fibers, the combination with the transverse channel, the screw-clamped flax holders placed thereon, the mechanism for unscrewing the holders, the traveling table divided into sectional lengths provided with spaces, and mechanism to grip and transfer the flax, of expanding fallers to expand laterally and reduce in thickness the stricks of flax, substantially as described.

11. In a machine for hackling flax and other long staple fibers, the combination with the transverse channel, the screw-clamped flax holders placed thereon, the mechanism for unscrewing the holders, the traveling table divided into sectional lengths provided with spaces, and rollers by which the flax is gripped and drawn from the holders, of expanding fallers, faller blocks, faller pins, and means for expanding and contracting the fallers, substantially as described.

In testimony whereof I have hereunto set my hand in presence of two subscribing witnesses.

JOSHUA VALENTINE EVES.

Witnesses:
GEORGE FREDERICK SHAW,
THOMAS JAMES VANCE.